(No Model.) 2 Sheets—Sheet 1.
A. W. BROWNE & G. L. HARRISON.
DENTAL HANDPIECE.
No. 560,312. Patented May 19, 1896.
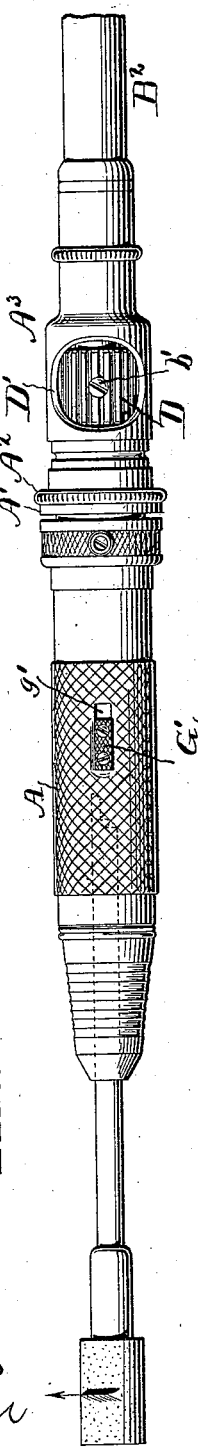
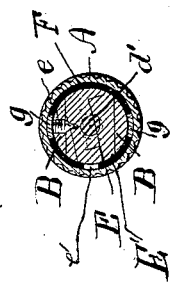
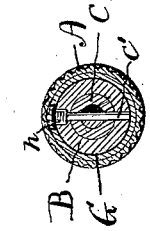
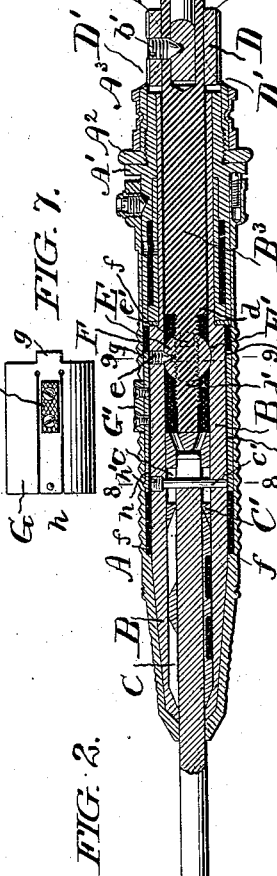
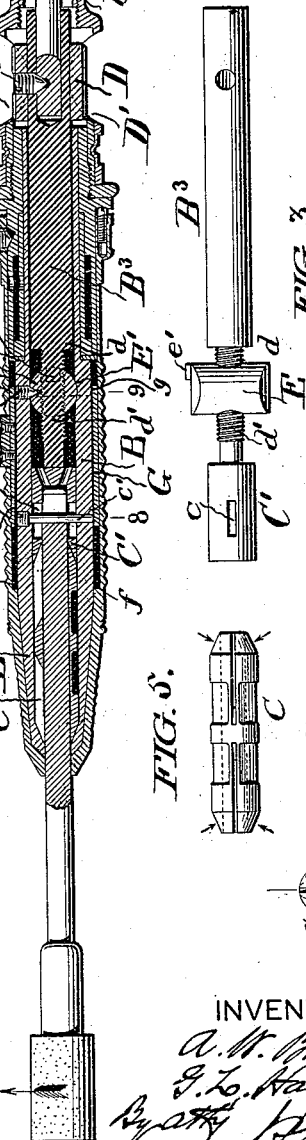
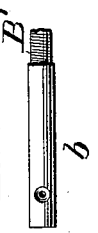
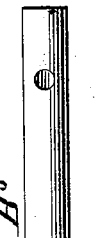
WITNESSES:
INVENTORS (No Model.) 2 Sheets—Sheet 2.
A. W. BROWNE & G. L. HARRISON.
DENTAL HANDPIECE.
No. 560,312. Patented May 19, 1896.
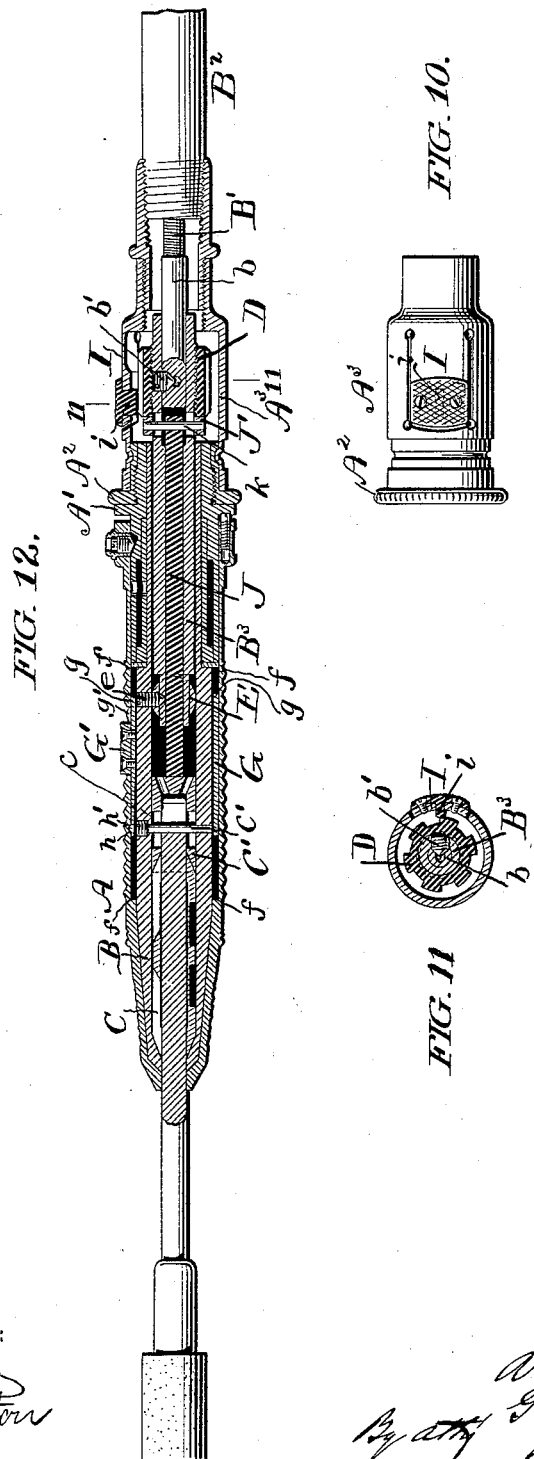
WITNESSES: INVENTORS

UNITED STATES PATENT OFFICE.

ARTHUR W. BROWNE AND GEORGE L. HARRISON, OF PRINCE'S BAY, NEW YORK, ASSIGNORS TO THE S. S. WHITE DENTAL MANUFACTURING COMPANY, OF PHILADELPHIA, PENNSYLVANIA.

DENTAL HANDPIECE.

SPECIFICATION forming part of Letters Patent No. 560,312, dated May 19, 1896.

Application filed March 20, 1896. Serial No. 584,139. (No model.)

*To all whom it may concern:*

Be it known that we, ARTHUR W. BROWNE and GEORGE L. HARRISON, citizens of the United States, residing at Prince's Bay, in the county of Richmond and State of New York, have invented certain new and useful Improvements in Handpieces for Dental and other Tools; and we do hereby declare the following to be a full, clear, and exact description of the invention, such as will enable others skilled in the art to which it appertains to make and use the same.

Our invention relates to certain improvements, as hereinafter claimed, in means by which tools may be easily connected securely with and as readily disconnected from the rotary spindles of handpieces.

In the accompanying drawings, showing a suitable organization of our improvements, with some modifications thereof, Figure 1 is a longitudinal view, and Fig. 2 a view partly in side elevation, but mainly in longitudinal central section, showing the handpiece, a tool carried thereby, and the driving-shaft connection. Fig. 3 shows the handpiece coupling-rod by means of which motion is imparted to the handpiece-spindle and the tool-chuck actuated. Fig. 4 shows the end coupling or stiff section of the flexible driving-shaft for connection with the coupling-rod of the handpiece. Fig. 5 is a longitudinal view, and Fig. 6 an end view, of the toolchuck or holder. Fig. 7 shows the sleeve for engaging and disengaging the spindle and the handpiece-casing. Figs. 8 and 9 are transverse sections on the lines 8 and 9, respectively, of Fig. 2. Fig. 10 is a plan view showing a modified construction of the swiveling section of the handpiece; and Fig. 11, a section on the line 11 of Fig. 12, including parts within the handpiece. Fig. 12 is a longitudinal section in the plane of the section shown by Fig. 2, showing a modified construction.

The handpiece-casing shown is in many features of construction substantially the same as heretofore commonly employed with dental engines—such, for instance, as shown in United States Patent No. 291,571, dated January 8, 1884—and comprises the detachably and adjustably connected front or main section A and union-section A', the connecting-section $A^2$, screwed to the union-section, and the rear section $A^3$, having swiveling connection with the main section by way of the union and connecting sections.

The tubular rotary spindle B of the handpiece carries within its forward portion, as usual, a sectional tool-chuck, consisting of the main cone-ended split section C and the auxiliary section C', having a socketed front end for embracing the rear cone end of the main section and provided with the elongated slot $c$, through which passes the pin $c'$ for adjustably engaging this section with the rotary spindle and assisting in locking the tool employed in place by engaging its shank, as will readily be understood.

A flexible driving-shaft B', provided with the usual sheath $B^2$, connected with the swiveling rear section of the handpiece-casing, is connected with the rear end of a coupling-rod $B^3$, which is mounted in the tubular rotary spindle. Detachable connection between the flexible shaft and the coupling-rod is shown as made by inserting the stiff section $b$ of the shaft into a socket in the rear end of the coupling-rod and securing the parts by a set-screw $b'$.

The coupling-rod $B^3$ is adapted to serve as a coupling for connecting the flexible shaft with the spindle to impart rotary motion thereto, and is also adapted, in the preferred organization of our improvements, to be turned in the spindle for actuating the tool-chuck.

For turning the coupling-rod independently of the spindle a collar or short sleeve D, suitably roughened on its outer surface, as by ribs, to afford a firm grasp for the finger and thumb, is secured to the coupling-rod near the rear end thereof within the swiveling rear section $A^3$ of the handpiece-casing. The screw $b'$ serves to detachably secure the collar to the coupling-rod. The handpiece-casing is cut away or provided with openings D' D' at opposite sides to expose the collar and admit of its being readily grasped. The coupling-rod for the greater portion of its length is of a diameter adapting it to fit so as to turn freely in the bore of the rotary spindle, is shouldered at *d*, and reduced in diameter in advance of this shoulder, the reduced front portion *d'* of the rod being provided with a screw-thread which engages a female screw in a connecting-piece E, which may be termed a "nut," as the threaded portion of the rod screws through it. This nut has connection with the spindle, so as to be prevented from turning independently of it, such connection being most easily made by fitting the nut in a hole E' through the spindle and detachably securing it by a set-screw *e*.

Provision is made for locking the spindle to the front section of the handpiece-casing, in order that when this section is grasped with one hand and the coupling-rod collar D with the other a tool may be locked in or released from the chuck by endwise movement of the coupling-rod by the working of its threaded portion in the nut E, which, as before explained, is fixed to the spindle. To most readily lock the spindle to the front or hand-grasped section of the handpiece-casing, the locking connection between the parts is through the medium of the nut, which is provided at one end with a lug or shoulder *e'*, which projects into a space F left between annular shoulders *f f* within the front section of the handpiece-casing. A slide G, formed by a sleeve fitting in the space F, is provided at opposite sides of its rear end with lugs *g g*, which when the slide is moved rearwardly cross the path of rotation of the nut-lug *e'*, and contact of this lug with either lug of the slide instantly arrests the rotation of the nut, and consequently that of the spindle, independently of the rotation of the handpiece-section A. It will be seen that when the front section of the casing is locked to the spindle the turning of this section to the left and of the coupling-rod to the right by its collar forces the front end of the rod against the tool-chuck and clamps the tool-shank, while by reversals of these turning movements the coupling-rod is retracted and the tool-shank released. Obviously the front section of the casing may be turned while the collar is held firmly or the collar turned to adjust the rod while the front section of the casing is held against turning. By providing the coupling-rod collar within the swiveling section of the casing it will be obvious that when the collar is grasped it may be turned freely relatively to the front section of the casing with the swiveling section, or the collar, and with it the swiveling section, may be held against turning, while the front section may be freely turned to the extent desired. When the slide is pushed outwardly to move its lugs out of dogging contact with the nut-lug, the spindle is free to rotate in the handpiece-casing. For actuating the slide it is provided with a suitable finger-piece G', working in a slot *g'* in the front section of the casing and preventing the slide from turning in this section. To provide for holding the slide out of dogging connection with the nut, it is provided with a spring-catch *h*, adapted to yieldingly engage with a notch in the inner surface of the casing-section at *h'*. This catch is shown as formed by a tongue produced by slitting the slide. The frictional connection of the catch with the casing, while amply sufficient to prevent accidental movement of the slide, permits the slide to be readily actuated by pressure of the finger.

Among various modifications which may be made in our improvements may be mentioned the following: As shown by Figs. 10, 11, and 12, the side openings in the swiveling section of the handpiece-casing may be omitted and the collar D of the coupling-rod be adapted to be engaged by the fingers through the instrumentality of a spring-catch I on the swiveling section of the handpiece-casing instead of directly. Obviously when this section is so grasped as to force inward the catch its lug *i* engages between the teeth or ribs of the collar and enables the operator to hold the coupling-rod against turning, while it may be either advanced or retracted by turning the front section of the casing to the left or right, as required to lock or release a tool, when the spindle and front section of the casing are engaged by means of the slide and lug on the nut or piece E. As shown by Figs. 11 and 12, the collar D, instead of being fixed to the coupling-rod by a set-screw, as before explained, and as it might be for use in connection with catch I, is screwed upon it, and the coupling-rod is made tubular, and a rod J, passing through it, acts at its outer end upon the tool-chuck and is connected at its rear or inner end with a slide J' by means of a pin *k*, working in a cross-slot in the coupling-rod. The collar D acts upon the slide J'. The connecting-piece E has the end lug for engagement with the lugs of the slide G and is fitted in the spindle, as before explained. Screwing the collar D to the right clamps the tool-shank in the chuck, and screwing it in the opposite direction leaves the tool free to be withdrawn; or the collar may be held against turning and the front section of the casing, when locked with the spindle, be turned to the left or right, according to whether the tool is to be clamped or released. It will be seen that in this modification the coupling-rod has no endwise movement in the spindle, the chuck being actuated by the endwise movement of the rod J in the coupling-rod.

Handpieces constructed in accordance with our improvements are suitable for use not only by dentists but may be made of any desired dimensions, are adapted to very firmly clamp the tools, and may most advantageously be used in connection with power-actuated flexible shafts by die-sinkers and others requiring stronger mechanism and more power than needed by dentists.

We claim as our invention—

1. The combination of the sectional handpiece-casing comprising the front section and the swiveling rear section, the tubular spindle mounted to rotate in the casing, means for engaging and disengaging the spindle and the front section of the casing, the tool-chuck in the spindle, and the chuck-actuating mechanism adapted to be operated by the turning of the front and rear sections of the casing relatively to each other when the front section of the casing and the spindle are locked together, substantially as set forth.

2. The combination of the sectional casing comprising the front section and the swiveling rear section, the tubular spindle mounted to rotate in the casing, the tool-chuck within the spindle, mechanism for actuating the chuck comprising the coupling-rod to which motion is imparted by the driving-shaft and by which the spindle is rotated, means for engaging and disengaging the front section of the casing and the spindle, and means on the coupling-rod within the swiveling rear section of the casing and adapted to be turned with said section for actuating the chuck by the turning of the front and rear sections of the casing relatively to each other when the front section and the spindle are locked together, substantially as set forth.

3. The combination of the sectional handpiece-casing comprising the front section and the swiveling rear section, the tubular spindle mounted to rotate in the casing, the tool-chuck within the spindle, mechanism for actuating the chuck, the slide carried by the front section of the casing, and means adapted to be engaged by the slide for locking the front section of the casing to the spindle to admit of the chuck-actuating mechanism being operated by the turning movements of the casing-sections, substantially as set forth.

In testimony whereof we affix our signatures in presence of two witnesses.

ARTHUR W. BROWNE.
GEORGE L. HARRISON.

Witnesses:
SEYMOUR CASE,
M. A. COLE.